United States Patent

[11] 3,629,721

[72] Inventors William Fulmer Fordyce
Woburn;
Edmund John Mitchell, Auburndale, both of Mass.
[21] Appl. No. 846,029
[22] Filed July 30, 1969
[45] Patented Dec. 21, 1971
[73] Assignee RCA Corporation

[54] ORTHOGONAL FILTERS
2 Claims, 3 Drawing Figs.

[52] U.S. Cl. .................................................. 330/107,
328/167, 330/109
[51] Int. Cl. .................................................. A03f 1/36
[50] Field of Search ........................................ 330/31, 30
D, 69, 28, 107, 109; 328/167; 333/70 R

[56] References Cited
UNITED STATES PATENTS
3,519,947 7/1970 Thelen ........................ 330/30

OTHER REFERENCES
Comer et al., " Inductorless Bandpass Characteristics Using All-Pass Networks" IEEE Transactions On Circuit Theory December 1968 pp. 501– 503
Mitra, " Synthesizing Active Filters" IEEE Spectrum January, 1969 pp. 47– 63

*Primary Examiner*—Roy Lake
*Assistant Examiner*—James B. Mullins
*Attorney*—Edward J. Norton ABSTRACT: An orthogonal filter is synthesized from a transfer function. The elements are calculated exactly, as opposed to trial and error. Filters are provided having a first and second impedance connected to the first and second input terminals of a differential amplifier, a third impedance connected between one input terminal of the amplifier and a point of reference potential and a fourth impedance is connected between the other input terminal and the output terminal of the amplifier.

PATENTED DEC 21 1971
3,629,721
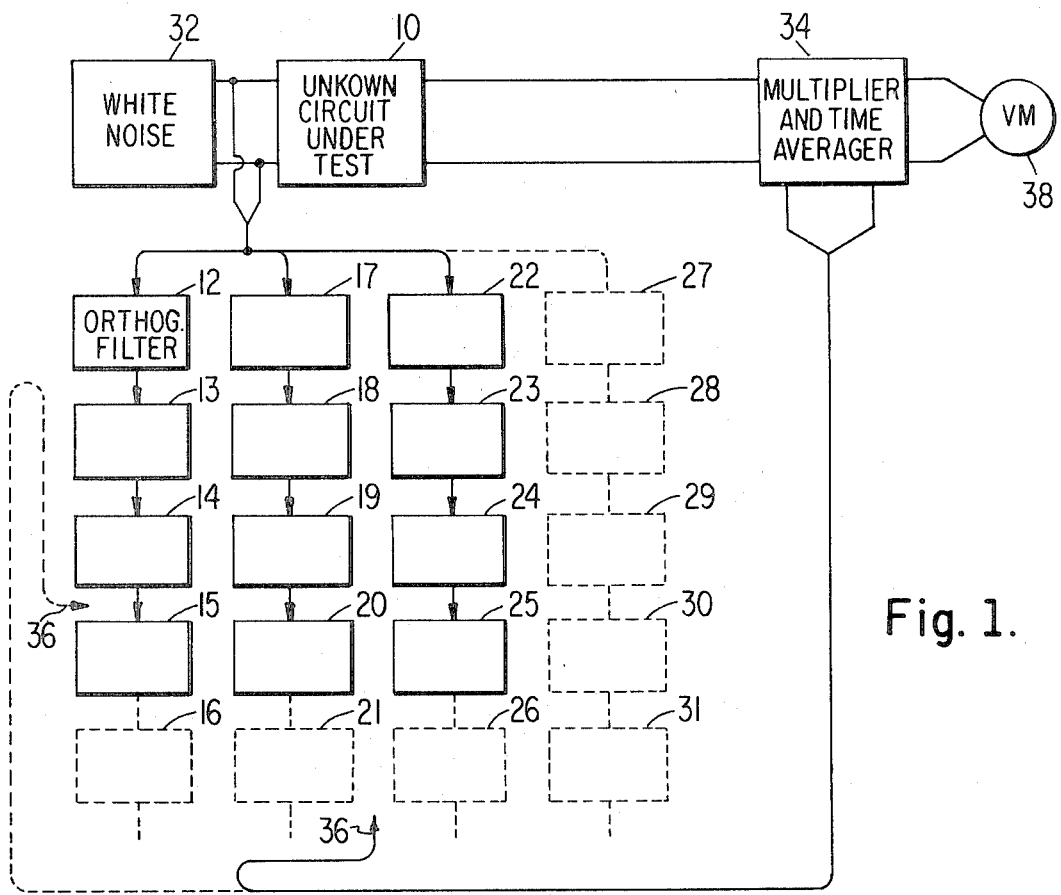
Fig. 1.
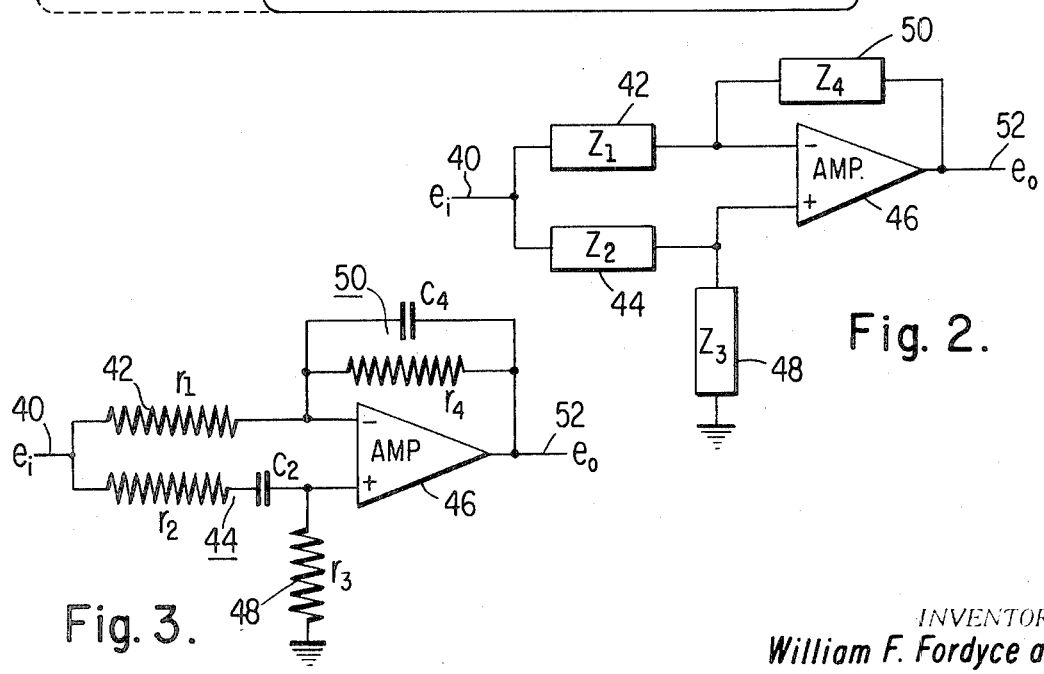
Fig. 2.
Fig. 3.
INVENTORS.
William F. Fordyce and
Edmund J. Mitchell.
BY Edward J. Norton
ATTORNEY

ORTHOGONAL FILTERS

This invention herein described was made in system."contract or subcontract thereunder with the Department of the Navy.

This invention relates to orthogonal filters.

In certain investigations into the nature of an unknown circuit, white electrical noise is applied to the unknown circuit and also to one or more of a plurality of orthogonal filters. Two filters are orthogonal with respect to each other if the integral over the limits zero to infinity (of time) of the product of the respective responses of the filters to a unit impulse applied to the inputs of the two filters is equal to zero. A unit impulse is the limiting value of an impulse whose amplitude is a and whose length is $1/a$, as a goes to infinity. The output from the unknown circuit and from various combinations of such filters are applied to a correlating circuit comprising a multiplier and time averaging circuit and the output voltage of the multiplier and time averaging circuit is measured. Simultaneous equations can be set up, using the measured results, which equations can be solved to determine the size and type of the various elements in the unknown circuit, only however if the filter circuits that are used are orthogonal. Such a system is disclosed in U.S. Pat. No. 3,102,231 entitled "White Noise Fault Detection system."

Known orthogonal filter circuits are usually designed by a cut and try method whereby accurate orthogonal circuits are difficult to realize. Use of filters which are not accurately orthogonal in the described method of circuit analysis leads to incorrect results. Furthermore, since known orthogonal filters have many elements, the difficulty of providing accurate orthogonal filters of the known type is multiplied by the large number of elements whose size must be determined.

It is an object of this invention to provide accurate orthogonal filter circuits.

It is another object of this invention to provide orthogonal filter circuits having few parts compared to known orthogonal filters.

In accordance with this invention, a filter is provided comprising a first and a second impedance which are connected respectively between a filter input terminal and the first and second input terminals of a differential amplifier. A third impedance is connected between the second impedance and its connection to the amplifier input terminal and a point of reference potential such as ground. A fourth impedance is connected between the connection of the first impedance and the input terminal of the differential amplifier and the output terminal of the amplifier which is also the output terminal of the filter. The values of the several impedances are chosen so as to provide a filter which is orthogonal with respect to another given filter. In one embodiment of the orthogonal filter, the first and third impedances are resistors, the second impedance comprises a capacitor and a resistor in series and the fourth impedance comprises a resistor and a capacitor in parallel.

The invention will be better understood upon reading the following description in connection with the accompanying drawing in which FIG. 1 is a block diagram of a circuit in which a plurality of orthogonal filters may be used to determine the elements comprising an unknown circuit under test, FIG. 2 is a circuit diagram of a family of orthogonal filters in accordance with this invention, and FIG. 3 is a circuit diagram of a preferred embodiment of an orthogonal filter of the type shown in FIG. 2, and having few elements or parts compared to known orthogonal filters.

FIG. 1 diagrammatically shows a test setup for an unknown circuit 10 using a plurality of orthogonal filter circuits 12 to 31. The orthogonal filters 12 to 31 are arranged in rows and columns. While only five filters are shown in each column, the filters 16, 21, 26 and 31 are shown in dotted lines to indicate that there may be more filters in each column. In a practical test setup, there may be a hundred filters, more or less, in each column thereof. While only four columns of filters are shown, the rectangles indicating the filters 27 to 31 are shown in dotted lines to indicate that there may be more than four columns of filters. In a practical test setup there may be 10 or more columns of filters. The filters in each column are cascaded.

A source 32 of white noise is provided. For the electrical wave appearing at the output of the source 32 to be white, the output wave must include all frequencies from zero to infinity and the amount of energy in all the frequencies must be equal to each other. For most practical purposes it is sufficient that the output of the source 32 contain all wavelengths from 0 to about 10,000,000 hertz, and that the energy in various frequencies differ by no more than 3 decibels. However, for other tests, the output of the source 32 should contain all wavelengths from 0 to much greater than 10,000,000 hertz, and the energy in the various frequencies should differ by no more than half a decibel. The output wave from the source 32 is applied to the input terminals of the unknown circuit 10 and also to the input terminals of each of the first filters 12, 17, 22 and 27 of the cascaded filters in each column. The output of the unknown circuit 10 is applied to one pair of input terminals of a multiplier and time averaging circuit 34 which may, for example, comprise a modulator. The other pair of input terminals of the multiplier 34 are connected to a two contact tap 36, shown for convenience as a single arrowhead. The tap 36, as indicated by both the solid and dotted portion of the line leading thereto, may be connected to any one output connection of any filter in any column of filters. For each connection of the tap to an output connection of a filter, the voltage shown by the meter 38 is read.

Each of the first filters 12, 17, 22 and 27 of the several columns are low-pass filters having different cutoff frequencies. Simultaneous equations can be set up using the values of voltages shown by the voltmeter 38 for each filter or combination thereof that intervenes between the source 32 and the multiplier 34. If the filters are orthogonal, the various values of voltages are independent of each other, whereby the simultaneous equations can be solved in a known manner including use of a computer. Solution of the problem tells what elements comprise the unknown circuit 10 and what are their connections and their values. If the filters are not accurately orthogonal the solution will be incorrect. As stated above, the filters 12, 17, 22 and 27 are low-pass filters. A general form of a filter than can be made orthogonal with respect to any filter 12, 17, 22 or 27 is shown in FIG. 2. A filter input terminal 40 is connected by way of respective first and second impedances 42 and 44 to the input terminals of a differential amplifier 46. A third impedance 48 is connected between the junction of the impedances 44 and the input terminal of the differential amplifier 46 and a point of reference potential such as ground. A fourth impedance 50 is connected between the junction of the impedance 42 and the input terminal of the differential amplifier 46 and the output terminal 52 of the differential amplifier 46. The output terminal 52 is also an output terminal of the filter of FIG. 2. The several impedances 42, 44 48 and 50 are also indicated, for convenience, as impedances $Z_1$, $Z_2$, $Z_3$, and $Z_4$ respectively.

Turning again to FIG. 1, it is desired that cascaded filters 12 and 13 be orthogonal with respect to filter 12 for example, and that, furthermore, any number of cascaded filters which includes the first filter in a column be orthogonal with respect to any other number of cascaded filters in the same column which also includes the first filter. The filters 13 to 16 and 18 to 21 and 23 to 26 and 28 to 31 may therefore be called orthogonal filter building blocks.

A filter is an orthogonal filter building block if its transfer characteristics $$H_{(s)} = \frac{E_o(s)}{E_i(s)} k \frac{s-a}{s+b}$$

where $E_o(s)$ is the output voltage Laplace transform of the filter, $E_i(s)$ is the input voltage Laplace transform of the filter, $k$ is a constant, and $s$ is a complex frequency variable of the form $\sigma + j2\pi f$, $\sigma$ being a real number and $f$ being a suitable frequency, and where frequencies *a* and *b* represent points on the *s* plane.

The *s* plane is defined as a plot of $\sigma$ plotted along the horizontal axis against $2\pi f$ plotted along the vertical axis, the points in the *s* plane indicating all possible values of *s*. The transfer characteristic $H(s)$ given above will have a zero value at point *a* and an infinite value at point *b*. For the filter of FIG. 2 to be an orthogonal building block, its transfer characteristic, $$\left[\frac{z_3}{z_2+z_3}\left(1+\frac{z_4}{z_1}\right)\right]-\frac{z_4}{z_1} \text{ must be equal to } k\frac{s-a}{s+b}$$

There are an infinite number of values of $Z_1$, $Z_2$, $Z_3$, and $Z_4$ that satisfy this equation to provide an orthogonal filter building block. It is advantageous to provide such a filter having a small number of elements.

FIG. 3 shows an orthogonal filter having a small number of elements. The similar elements of FIGS. 2 and 3 bear the same reference characters. In FIG. 3 the impedance 42 takes the form of a resistor $r_1$ and the impedance 44 takes the form of a resistor $r_2$ and a capacitor $c_2$ connected in series, the impedance 48 takes the form of a resistor $r_3$ and the impedance 50 takes the form of a resistor $r_4$ and capacitor $c_4$ in parallel. It is assumed that the amplification factor of the amplifier 46 is infinite which is a reasonable assumption since in practice, amplification factors of 100 million are readily obtainable.

The values of the several elements of FIG. 3 must be such as to satisfy the transfer characteristic equation if the filter of FIG. 3 is to be an orthogonal filter building block. One way this may be done is as follows: First one may pick the limiting high and low frequencies *a* and *b* respectively that in the judgement of the user will be useful. This fixes the value of *k* since *k* is equal to the square root of the ratio of *b* to *a*. Resistor $r_1$ ($z_1$ of the equation) is picked of a convenient size considering the impedance of the previous stage, and considering that the effect of stray capacity is greater for big resistors than small ones and that small resistors dissipate more power than large resistors. Having chosen a value for $r_1$ in ohms, $c_4$ (part of $z_4$) in farads is equal to the inverse of the product of *k*, *a*, and $r_1$. Resistor $r_4$ (also part of $z_4$) in ohms is equal to the inverse of the product of *b* and $c_4$ in farads. The values of resistors $r_2$ (part of $z_2$) and $r_3$ ($z_3$ of the equation) are related by a formula $$r_2 = r_3 \frac{1-k}{k}$$

and in general, any values of $r_2$ and $r_3$ that fits this equation may be used. However, to minimize the offset of the differential amplifier 46, the impedance to ground of the two input terminals of the differential amplifier 46 are equalized by making the value of $r_3$ equal to the value of $r_1$ and $r_4$ in parallel. Since the value of $r_2$ is equal to the value of $r_3$ times the ratio of $1-k/k$, and since $c_2$ (part of $z_2$) is equal to *k* divided by the product of $r_3$ and $b+ka$, the values of $r_2$ and $c_2$ follow immediately. Therefore an accurately orthogonal filter for any desired value of *a* and *b* is readily obtainable.

We claim:

1. An accurate orthogonal filter building block comprising:
   an amplifier having a pair of input terminals and an output terminal,
   a first and a second impedance connected between a filter input terminal and respective input terminals of said amplifier,
   a third impedance connected between the junction of said second impedance and an input terminal of said amplifier and a point of reference potential,
   a fourth impedance connected between the junction of the first impedance and the amplified input terminal and the output terminal of said amplifier, said output terminal of said amplifier being an output terminal of said filter,
   each of said first and third impedances comprising a resistor, said second impedance comprising a resistor and a capacitor in series and said fourth impedance comprising a resistor in parallel with a capacitor,
   said filter having a transfer function satisfying the equation $$\left[\frac{z_3}{z_2+z_3}\left(1+\frac{z_4}{z_1}\right)\right]-\frac{z_4}{z_1}=k\frac{s-a}{s+[a]b}$$

in which equation $z_1$, $z_2$, $z_3$, and $z_4$ are respectively the said first, second, third and fourth impedances, *k* is a constant, *a* and *b* are useful frequencies and *s* is a complex function of a frequency 2. The invention as expressed in claim 1 in which the first resistive impedance in ohms is equal to the inverse of the product of a constant, a useful frequency, and the capacitive portion of said fourth impedance in farads, the resistive portion of the fourth impedance is equal to the inverse of the product of another useful frequency of said filter times the capacitive portion of said fourth impedance, the ratio of the resistive portion of the second impedance and the resistance comprising the third impedance is equal to the ratio of one minus said constant over the constant, while the capacitive portion of the second impedance is equal to said constant divided by the product of the resistance of the third impedance and the sum of the second mentioned useful frequency of the filter plus said constant times the first mentioned useful frequency, and said constant being equal to the square root of the ratio of said second said first useful frequencies.

* * * * *

UNITED STATES PATENT OFFICE
CERTIFICATE OF CORRECTION

Patent No. 3,629,721     Dated December 21, 1971

Inventor(s) William F. Fordyce et al

It is certified that error appears in the above-identified patent and that said Letters Patent are hereby corrected as shown below:

Column 2, lines 69-71    " $H_{(s)} = \frac{E_o(s)}{E_i(s)} k \frac{s-a}{s+b}$ "   should be $$-- H_{(s)} = \frac{E_o(s)}{E_i(s)} = k \frac{s-a}{s+b} --$$

Signed and sealed this 25th day of July 1972.

(SEAL)
Attest:

EDWARD M. FLETCHER, JR.          ROBERT GOTTSCHALK
Attesting Officer                Commissioner of Patents